July 14, 1959  J. COMPTON ET AL  2,894,841
PROCESS FOR THE PRODUCTION OF WORT
Filed July 11, 1957
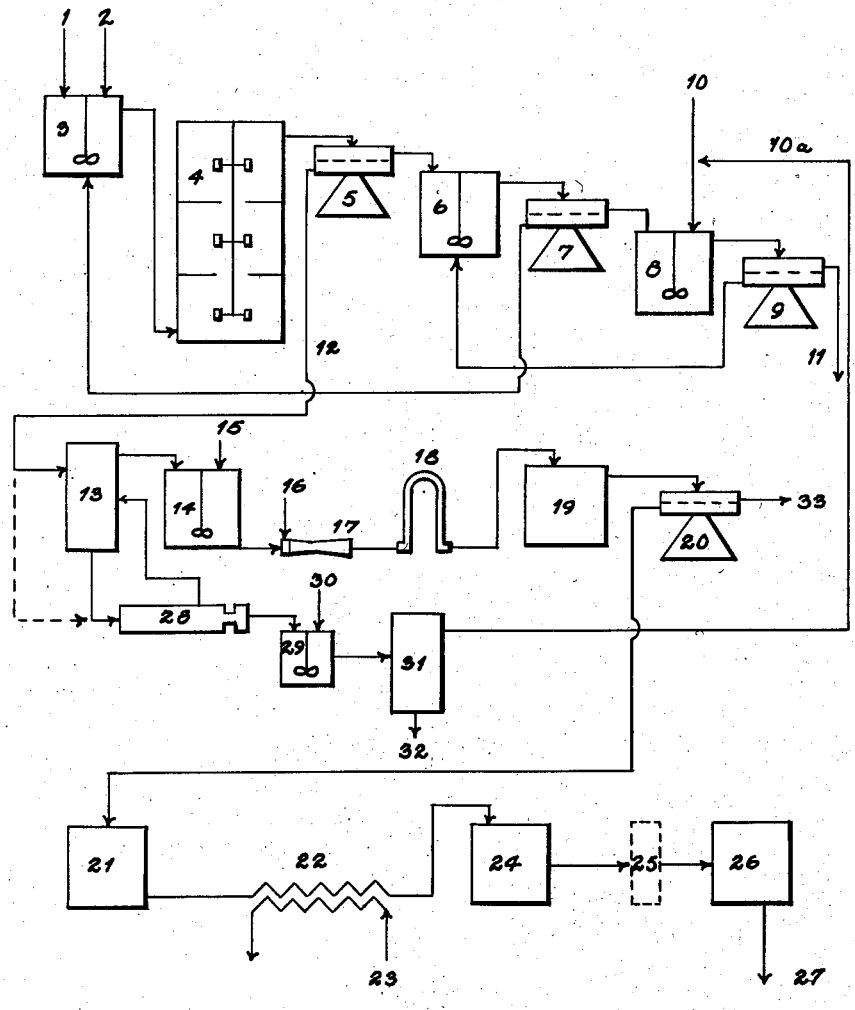
JOHN COMPTON
KENNETH H. GEIGER
BY *Smith & Piggau*
ATTORNEYS

United States Patent Office 2,894,841
Patented July 14, 1959

2,894,841

PROCESS FOR THE PRODUCTION OF WORT

John Compton and Kenneth Hartley Geiger, London, Ontario, Canada, assignors to John Labatt Limited, London, Ontario, Canada, a company of Canada Application July 11, 1957, Serial No. 671,165

15 Claims. (Cl. 99—52)

This invention relates to the production of brewer's wort and more particularly to a new process whereby brewer's wort may be produced in a continuous manner.

Conventional processes of producing brewer's wort are batch type operations involving large vessels and installations and subject to the generally recognized disadvantages of batch type operations. It has long been recognized as being most desirable that brewer's wort should be produced by a continuous process but hitherto a solution has not been found to certain problems involved in the conversion of the batch operation into a continuous operation.

One principal difficulty in the past has been that mechanical techniques generally used in solids-liquid separations would not be satisfactory due to the presence of fine solids, consisting essentially of suspended insoluble protein material, produced during the mashing operation. For example, standard industrial centrifuges will not effectively remove all the fine solids to give a clear effluent while industrial filters operating on a continuous basis are impractical because the solids form a slimy surface coating to plug the filter.

The present invention provides a solution to the above described difficulties and also provides many advantages not present in the conventional batch method. For instance, the invention makes possible the production of a highly uniform wort of acceptable quality with an increase in extract yield from the malt and adjunct. Malt grinds coarser and finer than those normally practicable in the conventional batch process may be used to improve the quality of the wort and the efficiency of the process. Spent grains are discharged in dewatered form in which they are fit to run direct to a drier and substantial decreases in operating and capital costs are made possible. Other objects and advantages of the process of the invention will become apparent as the specification proceeds.

Broadly speaking, the invention consists in a continuous method for the production of sweet brewer's wort which method comprises charging comminuted malt and any desired adjuncts to a slurrying vessel in controlled quantities; continuously delivering controlled amounts of mash makeup liquid to said slurrying vessel to maintain therein a mash slurry of desired constitution; continuously delivering said slurry to a mash vessel including a plurality of superposed mash zones; maintaining predetermined desired temperatures and hold-up times in each of said mash zones; continuously delivering mash slurry from the uppermost of said zones to a mechanical separator arranged to separate the slurry into a solids fraction containing husk and coarse solids and a liquid fraction containing the liquid and fine solids; continuously clarifying the liquid fraction and delivering the same as a clear sweet wort, continuously subjecting the solids fraction to countercurrent extraction in a plurality of stages, each of which stages comprises reslurrying with wash effluent from a succeeding stage under controlled temperature conditions and mechanical separation of the coarse solids whereby finally to produce a substantially fully exhausted coarse solids waste; the makeup water for the system being delivered to the last of said stages and the liquid fraction from the mechanical separation of the first stage being delivered to said slurrying vessel as the mash makeup liquid.

Preferably, according to the invention, the clarification of the liquid fraction containing the fine solids is effected by maintaining a settling zone into the upper region of which is fed said liquid fraction containing the fines solids, said settling zone having a cross-sectional area which when multiplied by the settling rate of the solids is greater than the volumetric flow rate at which the liquid is introduced, removing settled material and liquid from the lower regions of said settling zone; separating solids from said removed material at a rate at least equivalent to the rate of solids introduction in the feed to said settling zone, recycling the remainder of said removed settled material to an intermediate level of said settling zone; and continuously removing from the top of the settling zone a clarified wort liquid.

In connection with the delivery of the liquid fraction containing the fines solid to the above mentioned settling zone, it should be noted that under certain conditions it is advantageous to feed only a portion of the total flow directly to the settling zone, the remainder by-passing the settling zone and joining the settled material and liquid being removed from the lower region of the settling zone.

The clarified wort may be used in a conventional kettling operation, but preferably according to the invention the clarified wort is treated by a novel continuous kettling method which consists in injecting live steam directly into a moving stream of wort to raise the temperature thereof substantially above its atmospheric boiling point, maintaining the stream of wort under pressure at said temperature for a period of up to several minutes, releasing the pressure and continuously removing at least the readily removable solids components thereof to complete the kettle operation. Hops preferably shredded and/or hop extract for the kettling operation may be introduced in controlled amounts either prior to, simultaneously with, or after the injection of the live steam as will hereinafter be described in greater detail.

The invention and its operation will be described in greater detail with reference to the accompanying drawing wherein the figure is a flow sheet illustrating a preferred embodiment of the method of the invention.

Referring now more particularly to the drawing, ground malt is metered continuously through line 1 into vessel 3; if required, a suitable carbohydrate adjunct, ready for conversion, is metered through line 2 into vessel 3. In this vessel the malt and adjunct are mixed as a slurry with a dilute wort originating from the mechanical screen separation of the grain slurry from wash-vessel 6. The mash-slurry overflows through a port in vessel 3 and flows into the base of a multi-compartment mash-tower 4. The size of vessel 3 and the mash-tower 4 will determine the effective holdup time of the mash at any given flow rate; this holdup time establishes the time during which the chemical and physical changes, normally associated with the mashing process, occur. The greater the number of compartments in the mash-tower, the greater the extraction and conversion efficiency of process, other things being equal. Furthermore, a plurality of compartments in the mash-tower makes possible individual temperature control in each compartment. Temperatures may be selected in each compartment, to influence or alter the rates of the physical and chemical reactions to produce a wort of the required character and substance. For example, upward infusion can be readily employed.

The mash-slurry passes upward through the various compartments of the mash-tower and overflows through a port onto a mechanical vibrating screen separator 5. The screen separator 5 and the other screen separators are preferably of the type employing rotary impulse vibration. The process liquid passing through screen separator 5 is pumped through line 12 and apportioned between sedimentation tank 13 and centrifugal separator 28. The spent grains passing off screen separator 5 drop into wash-vessel 6 where they are met and mixed with a very dilute wort originating from the mechanical screen separation of the grain slurry from wash-vessel 8.

The mixed slurry in vessel 6 overflows onto another mechanical screen separator 7. The dilute wort passing through the screen is pumped up to vessel 3 and the spent grains passing off the screen drop into wash vessel 8.

Temperature adjusted treated water is metered through line 10 into wash-vessel 8 in such a manner that a predetermined and controllable ratio exists between the rate of water addition and rate of malt and adjunct addition. It should be noted that a part of this water may be made up of enriched wash water entering at 10A. The slurry in wash-vessel 8 overflows onto another screen separator 9. The very dilute wort passing through the screen is pumped to wash-vessel 6 and the spent grains discharged from the screen go to spent grain disposal via line 11. Screen separators 5, 7 and 9 may be of similar design if desired.

The clarified process wort taken from the top of sedimentation tank 13 passes to surge tank 14 equipped with a suitable stirring mechanism. Shredded hops (or hop extracts) are metered continuously into surge tank 14 through line 15 at a predetermined ratio to the wort feed entering the surge tank.

Considering the case where shredded hops in the dry state are used, the wort containing the hop suspension is picked up by a pump and forced through slurry heater 17 which is furnished with a controlled supply of clean live steam entering under pressure through line 16. The temperature of the wort is raised immediately to the 230–300° F. range depending on the control conditions there imposed, and passes through pipe line holder 18. The pipe line holder provides the necessary holdup time for the high temperature physical and chemical reactions to occur. The wort then passes into a flash cooler tank 19 where the pressure is reduced to approximately atmospheric.

Alternatively the hops or hop extract may be metered into the system at a later stage for instance with the live steam. Clearly, also, the process described may be used without the addition of any hops or hop extract to produce a bland kettled wort which may or may not as desired have flavouring matter introduced to it at a later stage.

The wort is next fed to a mechanical vibrating screen separator 20, of known type, to remove the hops and whatever small amount of precipitated and coagulated wort solids are carried out with them via 33. On leaving the separator 20 the wort goes to surge tank 21 and is picked up by a pump and forced through cooler 22 which is supplied with chilled water from line 23. The cooler so used would be preferably of the plate type. Chilled wort leaves the cooler and empties into surge tank 24. The worth in surge tank 24 can if necessary go direct to fermentation vessels or, as might be desirable, it can go first to a separation stage 25 and thence via another surge tank 26 and line 27 to fermentation. The separation stage 25 may be of any suitable type, one of the more convenient of which is the diatomaceous earth filter.

Returning now to the wort sedimentation tank 13, whilst clear supernatant is being drawn off the top, the fine solids in suspension are being concentrated at the bottom. These solids, in the form of a slurry, are taken from the bottom of the sedimentation tank 13 and pumped through a centrifugal separator 28. The separator 28 does not necessarily produce a clear effluent but rather one with reduced solids in suspension which is returned to sedimentation tank 13 at a suitable point.

The efficiency of separator 28 does not matter just so long as its size and design enables it to remove as many pounds of suspended solids per hour as are entering the sedimentation tank 13 via line 12. The wet solids discharged by separator 28 may contain varying small amounts of valuable sugars, which are recovered by dilution and mixing in wash tank 29. Dilution water enters at 30, the resuspended solids then go to sedimentation tank 31 from the top of which clear effluent containing the recovered solubles is returned to the process via 10A, and concentrated solids (accumulating at the bottom of sedimentation tank 31) are sent via 32 to sewer or by-product recovery operations, as they contain only expendable amounts of sugar.

It should be noted that the recovered solubles returning to process along 10A may go to tank 6 or tank 8, or be proportioned between the two.

It will be appreciated that all of the vessels illustrated in the flow sheet in Figure 1 including compartments in the mash-tower 4 are suitably equipped with conventional heating and control devices which are not shown in the drawings and which may be of any suitable known design.

It will also be appreciated that although the liquid level in many of the vessels is indicated as being controlled by a simple overflow system (this being the preferred liquid level control) any other known system of liquid level control may be utilized without altering the principles of operation described. A typical operation according to the invention is hereinafter described for purposes of illustration. It will be appreciated, however, that the procedure described and data disclosed are illustrative only and not intended in any way to restrict or limit the invention or its application.

A pilot installation according to the flow sheet illustrated in the figure was constructed and placed in operation.

The mashing and separating unit for the malt grains contained three vessels of approximately twenty imperial gallon capacity and a three compartment mash-tower with the capacity of each compartment approximately twenty gallons. The contents of the three vessels were kept freely agitated with propeller-type stirrers whereas the contents of each compartment of the mash-tower were stirred by turbine-type impellers located on a central shaft. A horizontal baffle plate with a hole in the centre separated the compartments in the mash-tower. This central hole was large enough to permit the free upward passage of the mash through the mash-tower, but small enough to inhibit excessive intermixing of the stirred contents of each compartment. Each vessel and each compartment of the mash-tower was baffled and equipped with steam coils for temperature regulation. A baffled overflow port was located near the top of each vessel, including the mash-tower. The vessels were all suitably elevated, as indicated in the figure, to permit the gravity flow of the grain slurry through the system.

The mechanical vibrating screen separators contained circular screens (stainless steel) 18″ in diameter. For a particular malt grind, a screen mesh of approximately 150 on each of the separators was found most satisfactory. Screen meshes as large as 94 worked well but tended to trap too many grains in the interstices of the wire mesh, screen meshes as small as 200 may be used on screen separators 7 and 9 (figure), but should not be used on screen separator 5 because the screen mesh is too small to pass the gluten-like solids freely.

Results which were taken from equilibrium data of three typical all-malt runs (no carbohydrate adjunct added) on the continuous mashing and separating unit are tabulated below.

| Run No. | Water Rate, gal./min. | Malt Rate, lbs./min. | Process Wort | | First Wash | | Second Wash | |
|---|---|---|---|---|---|---|---|---|
| | | | S.G., 20°/20° C. | Lbs. extract/100 lbs. sol'n | S.G., 20°/20° C. | Lbs. extract/100 lbs. sol'n | S.G., 20°/20° C. | Lbs. Extract/100 lbs. sol'n |
| 1 | 0.992 | 1.23 | 1.04117 | 10.28 | 1.00809 | 2.08 | 1.00175 | 0.45 |
| 2 | 1.285 | 1.75 | 1.04484 | 11.16 | 1.00964 | 2.47 | 1.00225 | 0.58 |
| 3 | 1.349 | 1.82 | 1.04345 | 10.82 | 1.00890 | 2.28 | 1.00204 | 0.53 |

Spent grains were discharged at approximately 80% moisture and the process wort carried with it gluten-like solids that represented approximately 1% (on a dry basis) of the weight of the wort.

The choice of temperature maintained in the various vessels and compartments of the mash-tower were dictated by the desired character and substance of the wort and in no way affected the mechanical operation of the process. Temperatures selected in the 120° F. to 165° F. range produced process worts, which upon subsequent yeast fermentation, produced beers of acceptable quality.

The production capacity of the mashing and seperation system was governed firstly, by the size of the vessels i.e. vessel 3 and mash-tower 4 (figure) which determined the holdup time of the mash and secondly, the separation capacity of the mechanical screens. A water feed rate at 2.9 imperial gallons per minute and a malt feed rate at 4.0 pounds per minute have been effected in the above system with little or no decrease in efficiency.

Wort produced in accordance with the foregoing was passed through the continuous kettling operation described in connection with the figure of the drawing. Shredded hops in the proportion of one pound per hundred gallons of wort were added to a clarified wort in tank 14. The contents of tank 14 were pumped through slurry heater 17 at a flow rate of 1¾ gallons per minute. Live steam introduced through line 16 was at 50 p.s.i. and raised the temperature of the wort to about 275° F. The back pressure maintained in the pipe line holder 18 was 34 p.s.i. Operating on this basis, the holdup time in pipe line holder 18 was 1.6 minutes. The gravity of the feed wort to the slurry heater was 13.3° P. and that of the outgoing "kettled" wort was 12.1° P. An isohumulone level of 20 p.p.m. was maintained in the wort leaving the flash tank cooler 19.

What we claim as our invention is:

1. A continuous method for the production of sweet brewer's wort, said method comprising continuously delivering comminuted malt and any desired adjuncts to a slurrying vessel in controlled quantities; continuously delivering controlled amounts of mash make-up liquid to said slurrying vessel to maintain therein a mash slurry of desired constitution; continuously delivering said slurry to a mash vessel including a plurality of superposed mash zones; maintaining a predetermined desired temperature and hold-up time in each of said mash zones; continuously delivering mash slurry from the uppermost of said zones to a mechanical separator arranged to separate the slurry into a solids fraction containing husk and coarse solids and a liquid fraction containing the liquid and fines solids; continuously clarifying the liquid fraction and delivering the same as a clear sweet wort; continuously subjecting the solids fraction to counter-current extraction in a plurality of stages each of which comprises reslurrying with wash effluent from a succeeding stage under controlled temperature conditions, and mechanical separation of the coarse solids, whereby finally to produce substantially fully exhausted coarse solids waste; the make-up water for the system being delivered to the last of said stages, and the liquid fraction from the mechanical separation of the first stage being delivered to said slurrying vessel as the mash make-up liquid.

2. A method defined in claim 1 in which the mash vessel has three superposed mash zones, each of said zones having a volume approximately equal to the slurry vessel.

3. The method defined in claim 2 in which there are three stages of counter-current extraction and the reslurrying in each stage is carried out in a vessel having a volume which is approximately the same as that of a single mash zone in the mash vessel.

4. The method defined in claim 1 in which separation of coarse solids from the mash slurry comprises delivering said mash slurry to a screen which is being subjected to rotary impulses, said screen having a standard mesh size selected in the 90 to 200 meshes per inch range.

5. The method defined in claim 1 in which the liquid fraction of the wort which contains the fines solids is clarified by maintaining a settling zone of said liquid fraction feeding additional of said liquid fraction to said settling zone at a volumetric rate which is not in excess of the cross-sectional area of said zone multiplied by the settling rate of the fine solids; removing a settled thickened material from the lower regions of said settling zone, separating solids from said removed material at a rate at least equivalent to the rate of introduction of fine solids to said settling zone; recycling the remainder of said removed thickened material to an intermediate level of said settling zone; and continuously removing clarified wort from the top of said settling zone.

6. The method defined in claim 5 in which the liquid fraction of the wort which contains the fines solid is apportioned between the settling zone and the settled thickened material leaving the lower regions of said settling zone.

7. A method as defined in claim 1 and comprising the addition of shredded hops to the wort; continuously injecting live steam directly into a moving stream of the wort to raise the temperature thereof substantially in excess of its atmospheric boiling point, maintaining the stream of wort under pressure at said temperature for a period of up to several minutes; releasing the pressure; and continuously removing at least the readily removable solid components thereof to produce a hopped wort.

8. The method as defined in claim 7 wherein the addition of shredded hops to the wort takes place simultaneously with the introduction of live steam thereto.

9. The method as defined in claim 7 wherein the addition of shredded hops to the wort takes place after the introduction of live steam.

10. A method as defined in claim 1 and comprising the addition of hop extract to the wort; continuously injecting live steam directly into a moving stream of the wort to raise the temperature thereof substantially in excess of its atmospheric boiling point, maintaining the stream of wort under pressure at said temperature for a period of up to several minutes; releasing the pressure; and continuously removing at least the readily removable solid components thereof to produce a hopped wort.

11. The method as defined in claim 7 wherein the addition of hop extract to the wort takes place simultaneously with the introduction of live steam thereto.

12. The method as defined in claim 7 wherein the addition of hop extract to the wort takes place after the introduction of live steam.

13. In the kettling of wort, the improvement which consists in continuously injecting live steam directly into a moving stream of the wort, to raise the temperature thereof substantially in excess of its atmospheric boiling point, maintaining the stream of wort under pressure at said temperature for a period of up to several minutes, releasing the pressure and continuously removing at least the readily removable solids components thereof, to produce a kettled wort.

14. A method of removing suspended fine solids from wort, said method comprising; maintaining a settling zone of said wort; feeding wort to said settling zone at a volumetric rate which is not in excess of maintaining a settling zone of said wort; feeding wort to said settling zone at a volumetric rate which is not in excess of the cross-sectional area of said zone multiplied by the settling rate of the solids, removing settled, thickened, wort material from the lower regions of said settling zone; separating solids from said removed material at a rate at least equivalent to the rate of solids introduction to said settling zone; and recycling the remainder of said removed wort material to an intermediate level of said settling zone; and continuously removing substantial solids free wort from the top of said settling zone.

15. The method defined in claim 14 in which the liquid fraction of the wort which contains the fines solid is apportioned between the settling zone and the settled thickened material leaving the lower regions of said settling zone.

References Cited in the file of this patent

UNITED STATES PATENTS

| | | |
|---|---|---|
| 512,311 | Manz | Jan. 9, 1894 |
| 2,758,030 | Metz | Aug. 7, 1956 |
| 2,768,897 | Paine | Oct. 30, 1956 |